Patented Aug. 13, 1940

2,211,485

UNITED STATES PATENT OFFICE 2,211,485

EFFERVESCENT ACETYL SALICYLIC ACID COMPOSITIONS

Frederick J. Zimmermann, Wausau, Wis.

No Drawing. Application September 26, 1938, Serial No. 231,783

6 Claims. (Cl. 167—57)

My invention relates to new and improved stable effervescent compositions containing acetyl salicylic acid.

In making effervescent medicinal preparations it is usual to employ suitable mixtures of citric or tartaric acid and sodium bicarbonate. When these salts are merely mixed with acetyl salicylic acid a mixture is produced which when dissolved in water will produce an effervescent solution. However, this mixture, either in powder, granules or tablet form, is not stable as the acetyl salicylic acid undergoes decomposition forming acetic acid and salicylic acid. The decomposition that takes place in about two or three months is so great that the mixture will not comply with United States Pharmacopaeia specifications for aspirin. This decomposition takes place even though greater or lesser proportions of sodium bicarbonate and citric or tartaric acid are used.

After considerable experimentation I have discovered that this difficulty can be overcome by providing a protective acid coating on the acetyl salicylic acid in the composition. This acid coating effectively prevents the acetyl salicylic acid from decomposing. Accordingly, in carrying out my invention I first prepare by any suitable method, granules or agglomerates containing a non-toxic, water-soluble, solid, anhydrous organic acid such as citric or tartaric acid and acetyl salicylic acid in suitable proportions, the citric or tartaric acid preferably being in excess. These granules are then mixed with sodium bicarbonate and citric or tartaric acid in suitable proportions to give a composition which when dissolved in water will give an effervescent solution. The composition prepared in this manner will remain stable for an indefinite period of time in the form of powder, granules, or tablets.

The following is a specific embodiment of my invention illustrating the manner of compounding the composition.

15 pounds of citric acid powder are mixed with about 6 pounds of aspirin and heated gently until fusion occurs and all the water of crystallization of the citric acid is driven off. The resulting mixture is then comminuted in any suitable manner to provide granules of citric acid carrying acetyl salicylic acid. These granules are then mixed with about 33 pounds of sodium bicarbonate granules containing, if desired, any suitable flavoring compounds and 15 pounds of citric or tartaric acid powder. The final mixture so prepared may then be compressed at 60 grains to contain 5 grains of aspirin.

The proportions given in the above example may be greatly varied. The amount of citric acid and sodium bicarbonate may be materially reduced, say about one-half, when for example effervescent granulated compositions are to be made which are to be dispensed without compressing. As a further variation of the above example I may fuse all of the citric acid (i. e., 30 lbs.) with the acetyl salicylic acid and then after granulaing the mixture I add the sodium bicarbonate to produce an effervescent mixture.

An important feature of my invention thus resides in providing a composition in which the acetyl salicylic acid is coated with a protective acid so that the acetyl salicylic acid will not decompose when in contact with the sodium bicarbonate in the final composition. A sufficient amount of additional citric or tartaric acid is also present in my composition so as to produce an effervescent mixture with the sodium bicarbonate present when the composition is dissolved in water.

My invention is not limited to any particular method of compounding the composition. For example, instead of fusing the citric acid and acetyl salicylic acid mixture and forming granules therefrom, I may dissolve anhydrous citric or tartaric acid in a minimum quantity of alcohol or other suitable solvent and coat the acetyl salicylic acid granules with this solution so as to provide acetyl salicylic acid coated with a protective anhydrous acid substance. The particles of acetyl salicylic acid coated with citric or tartaric acid are then mixed with sodium bicarbonate and acetic or tartaric acid to produce an effervescent composition.

It is to be understood that my invention is not limited to the specific embodiments or proportions herein given and that it is intended to include all modifications and variations of my invention within the scope of the appended claims.

I claim:

1. A composition of matter for producing an effervescent solution in water comprising particles of acetyl salicylic acid coated by a protective acid selected from the group consisting of citric and tartaric acid, said particles being mixed with sodium bicarbonate and an acid selected from the group consisting of citric and tartaric acid in an amount to provide an effervescent solution.

2. A composition of matter for producing an effervescent solution in water comprising particles of acetyl salicylic acid coated by a protective acid selected from the group consisting of citric and tartaric acid, said acid being in greater quantity than the acetyl salicylic acid, said particles being mixed with sodium bicarbonate and an acid selected from the group consisting of citric and tartaric acid in amounts to provide an effervescent solution.

3. A composition of matter for producing an effervescent solution in water comprising particles of acetyl salicylic acid coated by anhydrous citric acid, said particles being mixed with an amount of sodium bicarbonate and citric acid to provide an effervescent composition.

4. The method of preparing an effervescent composition of matter which comprises mixing an acid selected from the group consisting of citric and tartaric acid and acetyl salicylic acid, heating the resultant mixture until fusion occurs, driving off substantially all of the water of crystallization present in the acid, comminuting the mixture to form granules, mixing said granules with sodium bicarbonate in an amount to produce an effervescent solution when same is dissolved in water.

5. The method of preparing an effervescent composition of matter which comprises fusing a mixture of acetyl salicylic acid and citric acid in suitable proportions to provide a protective acid vehicle for the acetyl salicylic acid, comminuting said mixture to form granules, mixing said granules with sodium bicarbonate and an acid selected from the group consisting of citric and tartaric acid in amounts to provide an effervescent solution when the composition is dissolved in water.

6. The method of preparing an effervescent composition of matter which comprises forming granules of acetyl salicylic acid coated with an anhydrous acid selected from the group consisting of tartaric and citric acid, the acid being in predominant quantity, and mixing said granules with sodium bicarbonate and an acid selected from the group of citric and tartaric acid in amounts to provide an effervescent solution when same is dissolved in water.

FREDERICK J. ZIMMERMANN.